Feb. 23, 1960   E. A. ROCKWELL   2,925,824
FLUID CONTROL VALVE
Original Filed Dec. 15, 1952
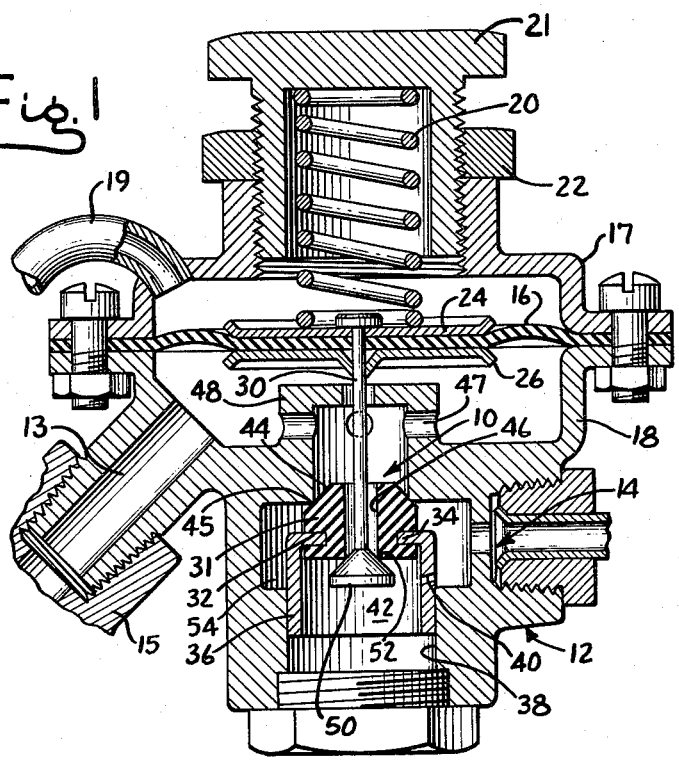
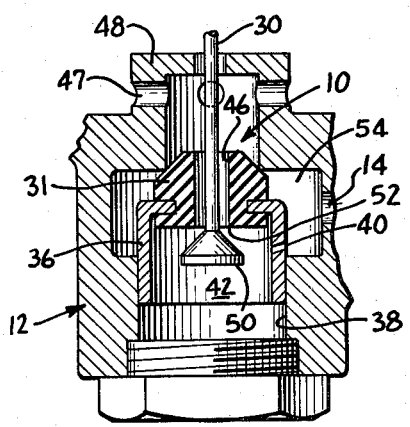
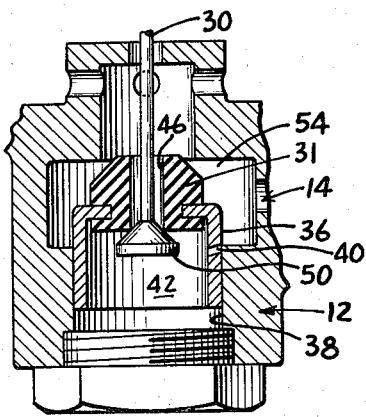
INVENTOR.
EDWARD A. ROCKWELL United States Patent Office 2,925,824
Patented Feb. 23, 1960

2,925,824

FLUID CONTROL VALVE

Edward A. Rockwell, Los Angeles, Calif.

Original application December 15, 1952, Serial No. 325,991, now Patent No. 2,656,081, dated August 25, 1953. Divided and this application June 14, 1955, Serial No. 515,401

4 Claims. (Cl. 137—490)

It is a general object of the invention to provide a valve for regulating flow of fluid through a conduit and which is effective to maintain a flat pressure characteristic over a wide range of flows.

This invention has particular but by no means exclusive utility in a valve for regulating the supply of liquid petroleum gas, such as propane and/or butane, to an automotive carburetor. The present application is a division of my application, now Patent No. 2,656,081, which discloses a carburetor particularly adapted for supplying liquid petroleum gas to an internal combustion engine of the automotive type, and in conjunction with which the present valve may be used.

Another more specific object, therefore, is to provide a pressure regulating and metering valve for supplying liquid petroleum gas to a carburetor for an internal combustion engine. A related object is to provide a valve for supplying such gas at a predetermined slight pressure above the atmosphere so as to maintain a desired ratio of air to gas vapor throughout the throttle range of the carburetor.

Another object is to provide a valve of the type which is operated by the pressure of the fluid controlled by the valve. A further object is to provide a valve assembly requiring little force exerted on the valve members to control large flow. A further object is to provide a regulator valve of the pilot pressure operated type, including a grommet made of resilient material and having a peripheral groove on which a tubular skirt member forming another element of the assembly, may readily be snapped. A further object is to provide a grommet valve assembly for a pilot pressure operated valve in which the resilient grommet is self-aligning and self-sealing with the associated valve members.

Other objects will appear from the following description read in connection with the accompanying drawings, in which:

Figure 1 is a sectional view illustrating the valve;

Fig. 2 is an enlarged fragmentary view showing the valve stem shifted to open the pilot hole in the center of the grommet; and Fig. 3 is an enlarged fragmentary view similar to Fig. 2 showing the valve assembly including the grommet after movement due to pressure to the open valve position.

There is shown in Figure 1 a pressure regulator including a valve 10 movable in the casing 12 to control flow of fluid such as liquid petroleum gas to an outlet 13 in the casing from an inlet 14. The casing 12 may be connected as by an inlet 14 to a suitable source of such fuel, such as a pressurized tank (not shown), and may be connected by the pipe 15 to a device using the fuel such as an internal combustion engine (not shown). In the present case, the flow through the casing 12 may vary over a wide range due to changes in demand. For instance, when connected to supply liquid petroleum gas to a carburetor of the type disclosed in my Patent No. 2,656,081, the flow rate varies from 0 to a maximum determined by the size of the carburetor and engine.

To maintain a uniform pressure of the fluid supplied via the outlet pipe 15 despite variations in demand and thus in flow, a pressure responsive diaphragm 16 is used to control the valve 10. The diaphragm 16 for this purpose is mounted in a regulating chamber within the valve casing 12 and may be made of suitable flexible material clamped between the mating flanges of a cover portion 17 and the body portion 18 of the casing. The upper surface of the diaphragm is connected to any appropriate control pressure, which may be atmosphere, through a tube 19.

For adjusting the pressure to be held by the valve 10, a spring 20 is used received in a spring retaining cup 21 having a lock nut 22. The lower end of the regulating spring 20 bears on a diaphragm plate 24, which is fastened to the diaphragm by a similar plate 26 and held together by a valve stem 30.

In keeping with the present invention, the valve 10 includes a resilient grommet 31 having an annular peripheral groove 32 in which the inturned edges 34 of the tubular skirt 36 may be snapped to hold the skirt and grommet together. In the present case the skirt 36 is slidably received in the end of the bore 38 in the casing or body 12. Further in carrying out the invention, a restricted orifice 40 is provided in the skirt through which fluid at inlet pressure may bleed into the chamber 42 within the skirt which forms a control chamber subject to inlet pressure. In the closed position of the grommet valve 10, shown in Figure 1, the higher inlet pressure holds the tapered upper edge 44 of the grommet against a shoulder 45 within the valve casing 12 which defines a valve seat.

The hollow center 46 of the grommet 31 connects the control chamber 42 with the outlet 13 via passages 47 in the central wall 48 of the housing 12 and the chamber containing the regulating diaphragm 16. The flow through the hollow center 46 of the grommet is controlled by a tapered valve head 50 carried by the valve stem 30. The lower end or mouth 52 of the hole 46 in the grommet provides, therefore, a control valve seat for the valve head 50.

As shown in Fig. 2, when increased demand at the outlet 13 causes the pressure under the diaphragm 16 to drop, thereby allowing the normally spring-biased-open valve head 50 to drop off its valve seat 52, the chamber 42 within the skirt 36 is put in communication with the outlet 13. With flow through the hollow center of the grommet restricted as in Figure 1, due to the restricted orifice 40 in the skirt 36, the pressure in the control chamber 42 within the skirt and the pressure in the annular inlet chamber 54 surrounding the skirt and grommet, are about equal.

When flow through the center 46 of the grommet is relatively unrestricted, for example, with the valve head 50 open as shown in Fig. 2, the pressure fluid within the control chamber 42 is dumped to the outlet 13 causing a reduction in the pressure within the skirt 36. Under these conditions the inlet pressure in the chamber 54 surrounding the skirt and acting on the effective area of the skirt and grommet tends to lower the grommet valve 10 within the casing 12 as shown in Fig. 3, allowing flow past the grommet at the upper valve seat 45. The diaphragm 16 responsive to the outlet pressure, is then effective to adjust the position of the head 50 of the valve stem 30, relative to the opening 46 in the grommet and thereby controls the vertical position of the grommet 31 and the flow through the valve casing to the outlet 13.

It will be apparent from the above that if demand is reduced or ceases, the diaphragm 16 is effective to lift the valve stem 30 and valve head 50 to raise the grommet 31 to a position more closely spaced thereto or against the upper valve seat 45, closing off flow past the grommet.

The regulating valve shown requires relatively few parts, all of which are either standard and thus readily available, or easily made. The cost of manufacture is low.

Among the important features affecting performance of the valve shown are those due to the configuration and arrangement of the resilient grommet 31. It provides a valve seat for the valve head 50, and an effective seal at this point due to its resilience. It also serves to seal at the upper valve seat 45. The grommet valve 10, moreover, is self-aligning in its action due to the resilience of the grommet 31 and the manner of its support by and connection with the tubular skirt 36. The grommet 31 may be readily assembled on the skirt 36, facilitating manufacture or replacement. The pilot action of the valve head 50, and the effect of pressure on the grommet valve 10 to open and close the valve, together contribute to provide a valve which requires little force from the diaphragm 16 to operate, yet it may control large flow and fluid at substantial pressures.

I claim:

1. In a pressure regulating valve for controlling the supply of fluid over a wide variation in flow demand from a source of relatively constant regulated fluid pressure, a valve housing having a bore therein, an outlet and an inlet in the housing communicating with the bore, means defining a valve seat in said bore between said inlet and outlet, a grommet valve in said bore including an annular member of resilient material having one side arranged to be seated on said seat to cut off communication between the inlet and outlet, pressure responsive means for moving said grommet valve relative to its seat, said pressure responsive means being mounted in said valve housing on the inlet side of said annular grommet valve member so as to be subject to inlet pressure and including a tubular skirt connected at one end to the other side of said annular member and mounted at the other end in said valve housing to extend and retract upon movement of said annular member relative to the valve seat, said tubular skirt defining a control chamber therein, means defining a metered restriction orifice for admitting fluid from said inlet to said control chamber, the passage through the center of said annular member connecting said control chamber with the outlet, and the mouth of said passage providing a control valve seat, a biased open valve head cooperating with said control valve seat, a pressure responsive member subject to outlet pressure, said valve head being actuated by said pressure responsive member against the bias on said valve head to produce a regulated outlet pressure, said pressure responsive member being arranged upon a drop in outlet pressure to actuate said valve head away from its seat so as to allow flow through said grommet valve passage, the opposite sides of the annular member being subject to outlet pressure and pressure in the control chamber, respectively, such that it will be held against its seat at low rates of flow through the orifice and passage and high pressure in the control chamber, said pressure responsive means being effective to move said annular grommet valve member away from its seat by increased rates of flow through the passage produced by further movement of the valve head away from its seat upon a further drop in outlet pressure when the pressure drop through said orifice produces a pressure in said control chamber lower than the inlet pressure.

2. In a pressure regulating valve for controlling the supply of fluid over a wide variation in flow demand from a source of relatively constant regulated fluid pressure, a valve housing having a bore therein, an outlet and an inlet in the housing communicating with the bore, means defining a valve seat in said bore between said inlet and outlet, a grommet valve in said bore including an annular member of resilient material having one side arranged to be seated on said seat to cut off communication between the inlet and outlet, pressure responsive means for moving said annular grommet valve member relative to its seat, said pressure responsive means being mounted in said valve housing on the inlet side of said grommet valve so as to be subject to inlet pressure and including a tubular skirt connected at one end to the other side of said annular member and slidably mounted at the other end in said housing to extend and retract upon movement of said annular member relative to the valve seat, said tubular skirt defining a control chamber, an orifice in said tubular skirt for admitting fluid from said inlet to said control chamber, the passage extending through the center of said annular member connecting said control chamber with the outlet, and the mouth of said passage providing a control valve seat, a biased open valve head cooperating with said control valve seat, a pressure responsive member subject to outlet pressures, said valve head being actuated by said pressure responsive member against the bias on said valve head to produce a regulated outlet pressure, said pressure responsive member being arranged upon a drop in outlet pressure to actuate said valve head away from its seat so as to allow flow through said grommet valve passage, the opposite sides of said annular grommet valve member being subject to outlet pressure and pressure in the control chamber, respectively, such that it will be held against its seat at low rates of flow through the orifice and passage and high pressure in the control chamber, said pressure responsive means being effective to move said annular grommet valve member away from its seat by increased rates of flow through the passage produced by further movement of the valve head away from its seat when the pressure drop through said orifice produces a pressure in said control chamber lower than the inlet pressure.

3. In a valve for controlling the supply of fluid, a valve housing having a bore therein, an outlet and an inlet in the housing communicating with the bore, means defining a valve seat in said bore between said inlet and outlet, a grommet valve in said bore including an annular grommet member of resilient material having one side arranged to be seated on said seat to cut off communication between the inlet and outlet, said grommet member having a peripheral groove, pressure responsive means for moving said annular grommet valve member relative to its seat, said pressure responsive means being mounted in said valve housing on the inlet side of said annular grommet valve member so as to be subject to inlet pressure and including a tubular skirt connected at one end to the other side of said annular grommet member by fitting into said groove and mounted at the other end in said valve housing to extend and retract upon movement of said annular grommet member relative to the valve seat, said tubular skirt defining a control chamber, means defining an orifice for admitting fluid from said inlet to said control chamber within said skirt, the passage extending through the center of said annular grommet member connecting said control chamber with the outlet, and the mouth of said passage providing a control valve seat, a valve head cooperating with said control valve seat, and means connected to said valve head for moving the latter relative to said control valve seat, the opposite sides of said annular grommet valve member being subject to outlet pressure and pressure in the control chamber, respectively, such that it will be held against its seat at no flow through the orifice and passage and inlet pressure in the control chamber, said pressure responsive means being effective to move said annular grommet valve member away from its seat upon flow through the passage produced by movement of the valve head away from its seat, when the pressure drop through said orifice produces a pressure in said control chamber lower than the inlet pressure.

4. In a valve for controlling the supply of fluid, a valve housing having a bore therein, an outlet and an inlet in the housing communicating with the bore, means defining a valve seat in said bore between said inlet and outlet, a grommet valve in said bore including an annular member of resilient material having one side arranged to be seated on said seat to cut off communication between the inlet and outlet, pressure responsive means for moving said annular grommet valve member relative to its seat, said pressure responsive means being mounted in said valve housing on the inlet side of said annular grommet valve member so as to be subject to inlet pressure and including a rigid tubular skirt connected at one end to the other side of said annular member and slidably received at the other end in said valve housing to extend and retract upon movement of said annular member relative to the valve seat, said tubular skirt defining a control chamber, means defining an orifice in said skirt for admitting fluid from said inlet to said control chamber within said skirt, the passage extending through the center of said annular member connecting said control chamber with the outlet, and the mouth of said passage providing a control valve seat, a valve head cooperating with said control valve seat, and means connected to said valve head for moving the latter relative to said control valve seat, the opposite sides of said annular grommet valve member being subject to outlet pressure and pressure in the control chamber, respectively, such that it will be held against its seat at no flow through the orifice and passage and inlet pressure in the control chamber, said pressure responsive means being effective to move said annular grommet valve member away from its seat upon flow through the passage produced by movement of the valve head away from its seat, when the pressure drop through said orifice produces a pressure in said control chamber lower than the inlet pressure.

References Cited in the file of this patent
UNITED STATES PATENTS

| | | |
|---|---|---|
| 788,352 | Crawford | Apr. 25, 1905 |
| 895,343 | Collin | Aug. 4, 1908 |
| 2,370,182 | Morrow | Feb. 27, 1945 |
| 2,645,884 | Kellie | July 21, 1953 |